Figure 1:
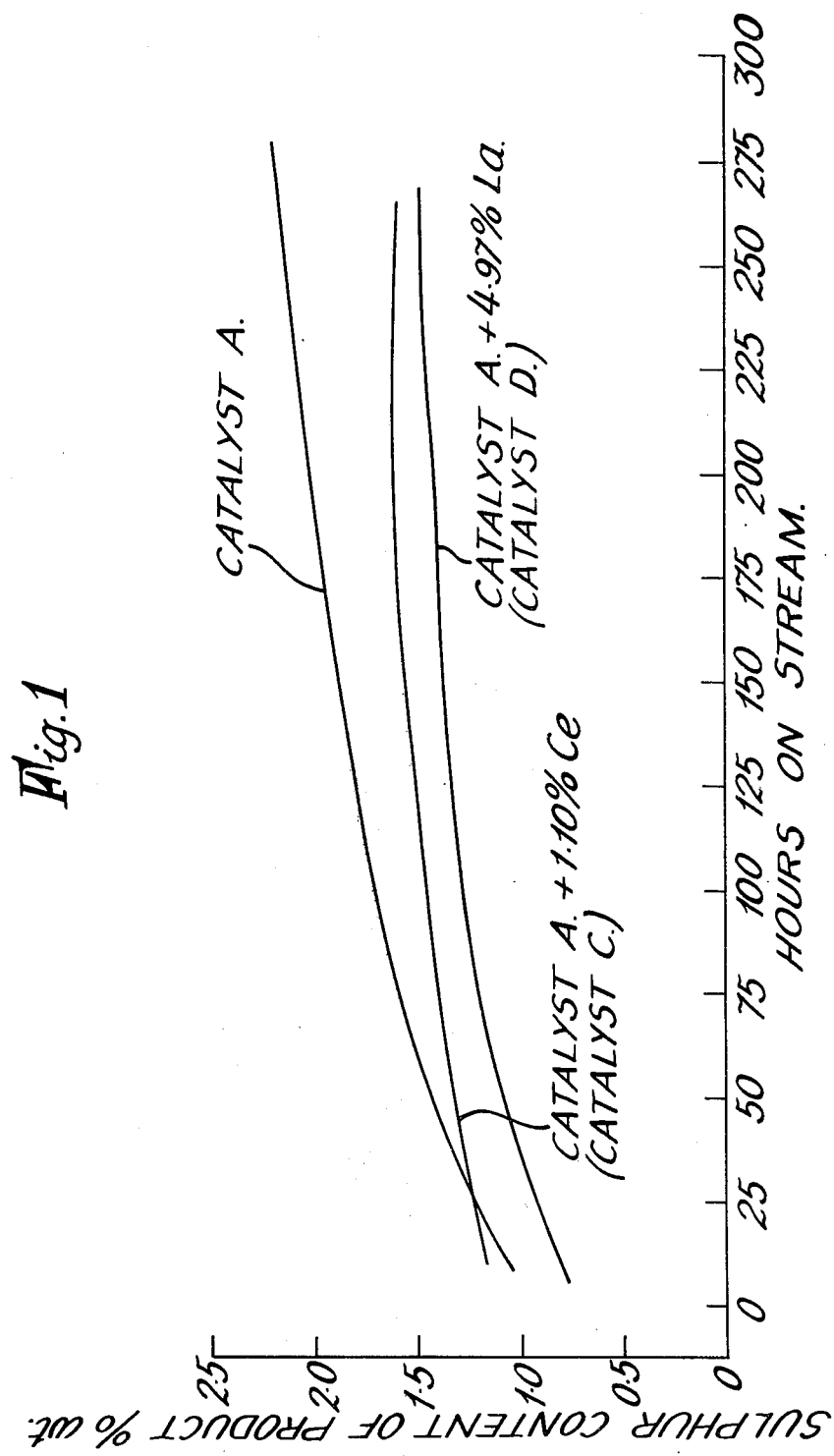

United States Patent [19]
Eyles et al.

[11] 3,975,303
[45] Aug. 17, 1976

[54] DESULPHURIZATION CATALYSTS

[75] Inventors: Martin Keith Eyles, West Molesey; Christopher Ronald Pout, Feltham, both of England

[73] Assignee: The British Petroleum Company Limited, London, England

[22] Filed: July 18, 1974

[21] Appl. No.: 489,566

[30] Foreign Application Priority Data
Aug. 15, 1973 United Kingdom............... 38576/73

[52] U.S. Cl............................... 252/462; 208/216
[51] Int. Cl.$^2$...................... B01J 23/10; B01J 23/84
[58] Field of Search...................... 252/462; 208/216

[56] References Cited
UNITED STATES PATENTS

| | | | |
|---|---|---|---|
| 3,250,699 | 5/1966 | Demeester...................... | 208/216 X |
| 3,299,156 | 1/1967 | Ashley et al................... | 252/462 X |

*Primary Examiner*—W. J. Shine
*Attorney, Agent, or Firm*—Morgan, Finnegan, Pine, Foley & Lee

[57] ABSTRACT

Hydro-desulphurization catalyst comprises 1–10% of an iron group metal, 5–25% of a Group VI A metal, and 0.1–10% of a rare earth on a refractory support. A preferred catalyst contains 3.7% Co, 12.5% Mo and 4.97% La on $Al_2O_3$.

The rare earth improves pore size distribution and desulphurization ability.

3 Claims, 2 Drawing Figures

DESULPHURIZATION CATALYSTS

This invention relates to catalysts suitable for the hydrodesulphurisation of hydrocarbon fractions containing sulphur compounds, particularly petroleum fractions and to their preparation and use.

The hydro-catalytic desulphurisation, or hydrofining, of petroleum fractions is a well established process. The catalysts used comprise a Group VIA metal compound (i.e. a compound of molybdenum, tungsten or chromium, particularly the first two) and an iron group metal compound (i.e. a compound of nickel, cobalt or iron, particularly the first two) on a refractory support. The Group VIA metal may be present in an amount of 5–25% wt expressed as metal and the iron group metal in an amount of 1–10% wt expressed as metal. Until recently the main interest has been in the desulphurisation of distillate petroleum fractions, but the current emphasis is very much on the desulphurisation of residues. Residues not only contain larger quantities of sulphur and nitrogen compounds than distillate fractions, but they also contain asphaltenes and, frequently, metal compounds, particularly compounds of vanadium and nickel, and it is accepted that they are much more difficult feedstocks for hydro-desulphurisation processes. A good residue desulphurisation catalyst requires not only high activity for desulphurisation but also good selectivity to minimise hydrogen consumption and the formation of carbonaceous deposits, and a high tolerance for carbonaceous and/or metal deposits.

It has now been found that the addition of a compound of a rare earth to a desulphurisation catalyst gives improved results in residue desulphurisation.

According to one aspect of the present invention therefore, a catalyst suitable for the hydro-desulphurisation of hydrocarbons comprising from 1–10% wt of an iron group metal, and from 5–25% wt of a Group VIA metal (as hereinbefore defined) on a refractory support is characterised in that it contains also from 0.1 to 10% wt of a rare earth, all weights being by weight of total catalyst.

The term rare earth means an element of Atomic Number 57 to 71. An alternative term is lanthanide. The preferred rare earths are lanthanum and cerium. A single rare earth or a mixture of rare earths may be used. If a mixture is used the total rare earth content should be within the above range of 0.1 to 10% wt.

The quantities above are expressed as elements by weight of total catalyst but the elements will normally be present as compounds, particularly the oxides or sulphides. Preferred combinations are cobalt and molybdenum, nickel and molybdenum, or nickel, cobalt and molybdenum, all originally present as oxides or sulphides, and nickel tungsten sulphide. If two or more iron group metals are used the total iron group metal content remains in the range 1–10% wt. The preferred amount of rare earth is from 1 to 8% wt.

The refractory support may be one or more oxides of elements of Groups II to IV of the Periodic Table particularly alumina, silica, or silica-alumina. A single oxide, particularly alumina, is preferred to limit side-reactions. The alumina may contain up to 5% wt of silica or phosphate to stabilise it and/or give the required pore characteristics. An alumina support means, therefore, one with at least 95% wt of alumina.

Sometimes, however, when treating petroleum residues, some hydrocracking and the production of lower-boiling products may be desirable in which case a support formed from two or more oxides would be preferred, particularly supports of 5–95% wt alumina and 95–5% wt silica.

The method of preparation of the catalyst as regards the iron group metal, the Group VIA metal and the support may follow standard practice. Thus the metals may be added by simultaneous or sequential impregnation with suitable salt solutions, followed by drying, calcination, and, if necessary, pre-sulphiding. The rare earth may also be added as a salt, for example a nitrate, acetate, sulphate or halide. These salts may be used in aqueous or alcoholic solutions. The rare earth may be added at any convenient stage of the catalyst preparation, and may, if desired be added to a preformed known desulphurisation catalyst.

According to another aspect of the invention a process for the hydrocatalytic desulphurisation of hydrocarbon fractions containing sulphur compounds comprises contacting the fraction at elevated temperature and pressure and in the presence of hydrogen with a catalyst comprising from 1–10% wt. of an iron group metal, from 5–25% wt. of a Group VIA metal (as hereinbefore defined) and from 0.1 to 10% wt. of a rare earth on a refractory support, all weights being by weight of total catalyst.

The feedstocks may be any sulphur containing hydrocarbon fractions, particularly petroleum fractions. They may be atmospheric distillate fractions i.e., fractions boiling in the range 50° – 350°C, but, preferably, they contain at least 25% wt. of material boiling above 350°C and more particularly at least 25% wt. of material boiling above 550°C. Particularly preferred feedstocks are atmospheric residues boiling above 350°C although wax distillates boiling within the range 350°–550°C and crude oils may also be treated. Depending on the original crude oil source the feedstocks may contain 1–8% wt. sulphur, 0–1% wt. nitrogen, 10–1000 ppm by weight of metals and 1–20% wt. of asphaltenes. The preferred feedstocks are straight run fractions, but products from previous treatment processes may also be used, e.g., vis-breaker distillates or residues, and cat cracker cycle oils.

The feedstock may also, if desired, be given a preliminary treatment to remove asphaltenes and/or metal compounds.

The desulphurisation process conditions may be chosen from the following ranges:

|  |  | Broad range | Preferred range |
|---|---|---|---|
| Temperature | °C | 150 – 600 | 250 – 500 |
| Pressure | bars (ga) | 10 – 500 | 50 – 250 |
| Space velocity | v/v/hr | 0.1 – 10 | 0.25 – 2.5 |
| Gas rate | m³ of $H_2$/m³ | 180 – 3600 | 500 – 1800 |

These variables may be adjusted in known manner depending on the level of desulphurisation required.

In residue desulphurisation, particular attention has been paid in recent years to the physical, as well as the chemical, characteristics of the catalysts used. The general consensus of opinion is that microporous catalysts, i.e., catalysts with a preponderance of pores below 300 A diameter combine good desulphurisation activity with reasonable life because there is less tendency for these microporous catalysts to pick up metals and asphaltenes present in the feed. Catalysts containing pores above 300A diameter tend to pick up metals.

This may be desirable in a preliminary reactor or guard chamber but is less desirable in a main desulphurisation chamber. The addition of rare earths to catalysts having differing proprotions of micropores (and hence differing metal removal chracteristics) has been tried, as will be shown in more detail hereafter, and improved results have been obtained in all cases. It would appear, therefore, that the rare earths are not merely altering the physical characteristics of the catalyst but are giving improved desulphurisation activity in itself.

The invention is illustrated by the following examples.

EXAMPLE 1

Preparation of Catalysts

The catalysts used were three commercial catalysts of cobalt and molybdenum oxides on alumina, the catalysts differing in the type of support used, in particular differening in the amounts of micropores (pores below 300A diameter) and macropores (pores above 300A diameter). Catalyst A had a significant macropore volume and a moderate micropore volume; catalyst B had a lower macropore volume and higher micropore volume.

In all the preparations, the catalyst was calcined at 550°C for 2 hours, and then placed while still hot into an impregnating solution at room temperature containing a rare earth salt. The mixture was allowed to cool and left at room temperature overnight. The mixture was evaporated to dryness, the impregnated catalyst being then dired at 120°C and calcined at 550°C for 2 hours.

The following preparations were carried out:

| | Catalyst | Impregnating solution |
|---|---|---|
| (a) | 200g of Catalyst A | 150 ml. of distilled water containing 6.20g of cerium sulphate. |
| (b) | 200g of Catalyst A | 150 ml. of distilled water containing 13.91g of lanthanum nitrate. |
| (c) | 150g of Catalyst B | 300 ml. of distilled water containing 18.32g of lanthanum nitrate. |
| (d) | 150g of Catalyst B | 150 ml. of distilled water containing 7.48g of lanthanum nitrate. The pH of this solution was adjusted to 7.0 by the addition of dilute ammonia. |

Inspection data on the catalysts before and after impregnation is given in Table I below.

In the catalyst compositions of Table I, the % wt. refers to the % of metal in the corresponding oxide components.

It will be seen that the addition of the rare earths to the catalysts has not seriously affected the physical characteristics of the catalysts, certainly not in the case of catalyst B. For catalyst A the addition of the rare earths appears to have increased the micropore volume and decreased the macropore volume somewhat.

EXAMPLE 2

Residue desulphurisation tests

1. Feedstock

This was an atmospheric residue from a Kuwait crude oil having the following inspection data. The feedstock used with catalyst F was marginally different than that used with catalysts A to E.

| | | For Catalysts A to E | For Catalyst F |
|---|---|---|---|
| Sulphur | % wt | 4.05 | 3.87 |
| Nitrogen | ppm wt | 2,300 | 2,070 |
| Ni | ppm wt | 19 | 16 |
| V | ppm wt | 52 | 49 |
| Na | ppm wt | 48 | 28 |
| Fe | ppm wt | 6 | 3.5 |
| Asphaltenes | % wt | 2.9 | 2.2 |
| Specific gravity at 60°F/60°F | | 0.9669 | 0.9610 |
| Conradson Carbon Residue | % wt | 10.3 | 9.8 |

2. Desulphurisation Activity Test 100 mls of each of the catalysts A to F were tested under the same conditions.

a. Presulphiding

Feedstock - gas oil containing added $CS_2$ to give 2.0% wt sulphur

| | |
|---|---|
| Pressue | 34.5 bars(ga) |
| Space velocity | 1.0 v/v/hr |
| Hydrogen rate | 1,800 v/v/hr |
| Initial temperature | 140°C |

The temperature was raised 20°C per hour to 320°C and held at 320°C for 1 hour.

b. Accelerated Ageing Test

The feedstock was changed to the atmospheric residue and the temperature raised from 320° to 400°C/hour. The test conditions were:

| | |
|---|---|
| Temperature | 400°C |
| Pressure | 103 bars(ga) |
| Space velocity | 1 v/v/hr |
| Gas rate | 840 m³ of $H_2$m³ |
| Time | 11 days |
| (c) Temperature response test | |
| Pressure | 103 bars(ga) |
| Space velocity | 0.5 v/v/hr |
| Gas rate | 840 m³ of $H_2$/m³ |

TABLE I

| | | Catalyst A | Catalyst A + Ce(C) | Catalyst A + La(D) | Catalyst B | Catalyst B + La(E) | Catalyst B + La(F) |
|---|---|---|---|---|---|---|---|
| Co | % wt. | 3.9 | 4.0 | 3.7 | 3.55 | 3.7 | 3.62 |
| $Mo_3$ | % wt. | 12.3 | 12.8 | 12.5 | 12.5 | 12.68 | 11.85 |
| Cerium | % wt. | — | 1.1 | — | — | — | — |
| Lanthanum | % wt. | — | — | 4.97 | — | 4.8 | — |
| Bulk density (max) | g/ml | 0.64 | 0.68 | 0.68 | 0.63 | — | — |
| Surface area | m²/g | 250 | 280 | 280 | 330 | 310 | — |
| Micropore volume | ml/g | 0.365 | 0.45 | 0.42 | 0.587 | 0.55 | — |
| Macropore volume | ml/g | 0.260 | 0.107 | 0.088 | 0.035 | 0.029 | — |
| Average micropore diameter | A | 58 | 64 | 65 | 71 | 70 | — |

-continued

Temperature        370, 395 and 420°C

The temperature was reduced to 370°C over 8 hours and a 12 hour test carried out during which the product was collected and analysed in bulk. The temperature was raised to 395°C over 8 hours and a similar 12 hour test performed, and then the temperature was raised to 420°C and a 12 hour test performed.

The results obtained are set out in Table 2 and 3 below.

Figure 2:
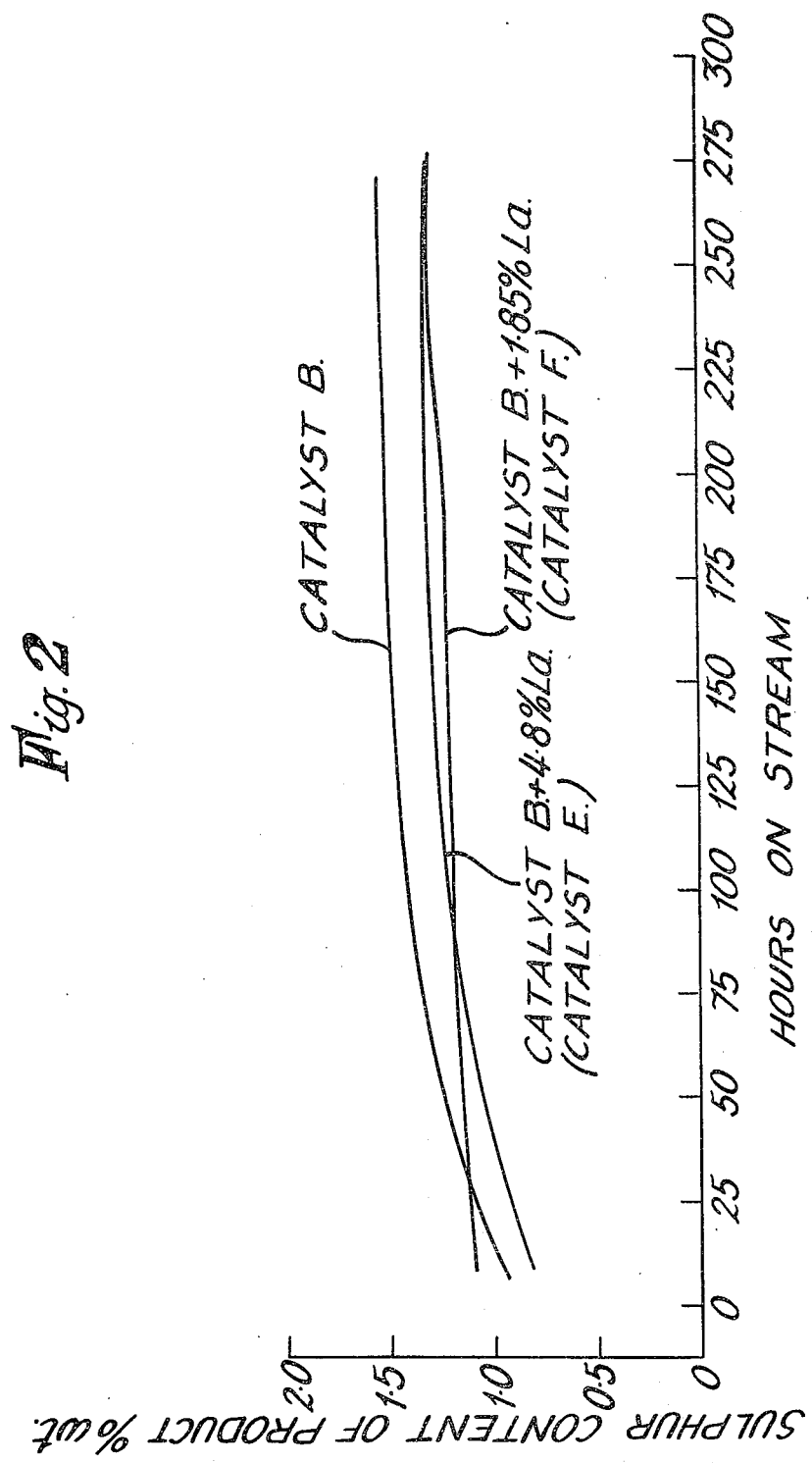

The improved results from adding lanthanum at two different levels to catalyst B are also clearly shown in Table 3 and FIG. 2. Catalyst B is clearly a more active catalyst than catalyst A, but even so, a further improvement in desulphurisation activity is obtained by the addition of lanthanum. This improved activity is shown in both the accelerated ageing test and the temperature response test. The same trend in asphaltene and metals removal as for Catalysts A, C and D is also shown for catalysts B, E and F indicating a lower asphaltenes and metal removal per unit weight of sulphur removed.

Although the feedstock used with catalyst F may

Table 2

| CATALYST | | Catalyst A | | | Catalyst A + Ce (C) | | | Catalyst A + La (D) | | |
|---|---|---|---|---|---|---|---|---|---|---|
| ACCELERATED AGEING TEST | | | | | | | | | | |
| Sulphur % wt in product at | | | | | | | | | | |
| 2 D.O.S. | | 1.65 | | | 1.51 | | | 1.09 | | |
| 5 D.O.S. | | 1.79 | | | 1.35 | | | 1.36 | | |
| 10 D.O.S. | | 2.12 | | | 1.72 | | | 1.48 | | |
| TEMPERATURE RESPONSE TEST | | | | | | | | | | |
| Catalyst Temp. | °C | 370 | 395 | 420 | 310 | 395 | 420 | 370 | 395 | 420 |
| PRODUCT ANALYSIS | | | | | | | | | | |
| Specific Gravity | 140°F/60°F | 0.9187 | 0.9058 | 0.8909 | 0.9105 | 0.8994 | 0.8793 | 0.9107 | 0.8956 | 0.8777 |
| Sulphur | % wt | 2.44 | 1.63 | 1.10 | 1.73 | 1.15 | 0.59 | 1.63 | 0.91 | 0.34 |
| Conradsen Carbon | % wt | 8.9 | 6.9 | 5.4 | 7.4 | 6.2 | 4.0 | 5.5 | 5.3 | 3.0 |
| Asphaltenes | % wt | 1.8 | 1.3 | 1.5 | 1.85 | 1.36 | 1.33 | 1.8 | 1.5 | 1.0 |
| Vanadium | ppm | 30 | 17 | 12 | 31 | 22 | 12 | 30 | 19 | 6 |
| Nickel | ppm | 11 | 7 | 6 | 10 | 8 | 4 | 10 | 7 | 3 |
| Sodium | ppm | <1 | <1 | <1 | 3 | 2.5 | 1 | 3 | 3 | 1 |
| Nitrogen | ppm | 2080 | 1880 | 1030 | 1920 | 1425 | 1060 | 1930 | 1620 | 1150 |

Table 3

| CATALYST | | Catalyst B | | | Catalyst B + La (E) | | | Catalyst B + La (F) | | |
|---|---|---|---|---|---|---|---|---|---|---|
| ACCELERATED AGEING TEST | | | | | | | | | | |
| Sulphur % wt in product at | | | | | | | | | | |
| 2 D.O.S. | | 1.26 | | | 1.08 | | | 1.12 | | |
| 5 D.O.S. | | 1.38 | | | 1.28 | | | 1.16 | | |
| 10 D.O.S. | | 1.57 | | | 1.35 | | | 1.37 | | |
| TEMPERATURE RESPONSE TEST | | | | | | | | | | |
| Catalyst Temp. | °C | 370 | 395 | 420 | 370 | 395 | 420 | 370 | 395 | 420 |
| PRODUCT ANALYSIS | | | | | | | | | | |
| Specific Gravity | 140°F160°F | 0.9084 | 0.8973 | 0.8769 | — | — | — | 0.9014 | 0.8870 | 0.8684 |
| Sulpur | % wt | 1.79 | 1.25 | 0.61 | 1.45 | 0.79 | 0.33 | 1.32 | 0.80 | 0.48 |
| Conradsen Carbon | % wt | 7.1 | 6.0 | 3.9 | — | — | — | 6.1 | 4.7 | 3.0 |
| Asphaltenes | % wt | 2.4 | 2.0 | 1.6 | — | — | — | 3.1 | 2.1 | 1.6 |
| Vanadium | ppm | 34 | 21 | 15 | 37 | 25 | — | 33 | 24 | 15 |
| Nickel | ppm | 12 | 10 | 6 | 12 | 9 | — | 8 | 8 | 5 |
| Sodium | ppm | <1 | <1 | <1 | — | — | — | 19 | 12 | <1 |
| Nitrogen | ppm | 1750 | 1400 | 1140 | — | — | — | 1570 | 1200 | 750 |

The results for the accelerated ageing test given in Table 2 are shown graphically in FIG. 1 (catalysts A, C, D). The results in Table 3 are shown in FIG. 2 (catalysts B, E, F).

The improved accelerated ageing test results obtained by adding cerium or lanthanum to catalyst A are clearly shown in Table 2 and FIG. 1. Not only is the extent of desulphurisation increased but there is a lower rate of decline in desulphurisation activity.

The improved desulphurisation activity is also shown in the temperature response test. In this part of Table 2 the levels of asphaltenes and metals in the product are also shown. The levels are not markedly different for the cerium and lanthanum containing catalysts (C and D) than for the base catalyst (A). Since, however, catalysts C and D have the greater desulphurisation activity, it follows that catalysts C and E have removed less asphaltenes and metals per unit weight of sulphur removed.

have been marginally easier to treat than that used with catalyst B, this would not in itself account for the extent of improvement shown. In any case the same feedstock was used with catalysts B and E.

Spent catalysts B and F were analysed to determine the amounts of carbon and metals deposited during the 330 hours of the activity and temperature response tests. The results are given in Table 4 below.

Table 4

|  |  | Catalyst B | Catalyst F |
|---|---|---|---|
| Carbon | % wt | 10.2 | 10.5 |
| *Nitrogen | % wt | 0.18 | 0.23 |
| *Sulphur | % wt | 6.1 | 6.65 |
| *Sodium | % wt | 1.1 | 0.22 |
| *Vanadium | % wt | 1.03 | 0.81 |
| *Nickel | % wt | 0.34 | 0.22 |

*Determined after calcination at 550°C to remove the carbon.

The lower deposition of sodium, vanadium and nickel on the catalyst F containing lanthanum is clearly shown. The average desulphurisation and average removal of metals with these two catalysts was, in fact,

|  | Catalyst B | Catalyst F |
|---|---|---|
| Average desulphurisation | 65.2 | 70.0 |
| Average V removal | 43.2 | 38.9 |
| Average Ni removal | 36.4 | 25.3 |

We claim:

1. A catalyst, suitable for use in the hydrodesulphurisation of hydrocarbons comprising: on a refractory support, a first metal oxide component selected from the group consisting of nickel oxide and cobalt oxide in an amount to give from 1 to 10% by weight of metal, a second metal oxide component selected from the group consisting of molybdenum oxide and tungsten oxide in an amount to give from 5 to 25% by weight of metal, and a third metal oxide component selected from the group consisting of lanthanum oxide and cerium oxide in an amount to give from 0.1 to 10% by weight of metal, all percentages being by weight of the total weight of catalyst.

2. A catalyst according to claim 1 wherein the refractory support is alumina.

3. A method of preparing a catalyst suitable for use in hydrodesulphurisation which method comprises adding (a) a solution of an oxide of a metal selected from the group consisting of nickel and cobalt in sufficient quantity to give a metal content of 1 to 10% wt., (b) a solution of an oxide of a metal selected from the group of molybdenum and tungsten in sufficient quantity to give a metal content of 5 to 25% wt. and (c) a solution of a salt of a metal selected from the group consisting of lanthanum and cerium in sufficient quantity to give a metal content of 0.1 to 10% by wt. to a refractory support, (a), (b) and (c) being added in any order; and, drying and calcining the resulting mixture.

* * * * *